Patented Feb. 23, 1943

2,311,770

UNITED STATES PATENT OFFICE 2,311,770

CONDENSATION DERIVATIVES OF RUBBER

Thomas C. Morris, Belmont, Mass., assignor to Wingfoot Corporation, Wilmington, Del., a corporation of Delaware No Drawing. Original application April 1, 1937, Serial No. 134,385. Divided and this application August 1, 1940, Serial No. 349,221

4 Claims. (Cl. 260—768)

This invention relates to the production of condensation derivatives of rubber by treating rubber with boron fluoride. It includes the use of boron fluoride complexes, such as ether and ester complexes, such as the complexes formed with dimethyl ether, methyl ethyl ether, di isopropyl ether, methyl acetate, ethyl formate, isopropyl acetate, etc. It includes the use of emulsifying and protective agents in the final step of the process in which boron fluoride reacts on a rubber cement, the reacted cement is poured in water and emulsified and the solvent of the cement is volatilized from the emulsion, the condensation derivative being thereby precipitated. It also includes volatilization of the cement solvent from an alkaline emulsion.

This application is a division of my application Serial No. 134,385 filed April 1, 1937.

Boron fluoride is a gas and it has therefore been found desirable to utilize this compound in the form of a complex. Ether and ester complexes dissolved in benzene have given satisfactory results. In carrying out the reaction the rubber cement may be treated with the ether complex until a reaction product of desired properties is produced. More intensive action of the condensing agent on the rubber gives an end product of higher softening point than that obtained with less intensive action. Therefore the reaction with the boron fluoride is continued for only a predetermined length of time in order to obtain the desired end point. The reacted cement is then poured into water. The water may contain sodium sulfite as a reducing agent if desired or the sodium sulfite may be omitted. It has been found that when the water is made alkaline by any suitable reagent, such as soda ash, etc., on removal of the cement solvent by steam distillation the end product is obtained in finely divided form. The particles of the end product are however so large that difficulty has been experienced in drying them. By adding an emulsifying and protective agent smaller particles are obtained. Sodium stearate is quite satisfactory but foams to a considerable extent. It has been found that by precipitating the sodium stearate with a zinc compound such as zinc sulfate a precipitate of zinc stearate is formed around the particles of the end product and serves as a protective colloid. By this procedure an end product of such fine particle size as to be readily dried is obtained and the foaming is not excessive. About one per cent of zinc stearate on the dry solids content of the bath is suitable. The resulting product is directly soluble in gasoline.

In carrying out the process the following general procedure may be followed:

Pale crepe rubber is milled to a plasticity of about 300 (Williams plastometer). This is dissolved in benzene to produce a 12.5% cement. This cement is brought to about boiling by heating with steam in the jacket. After cooling the jacket to about the boiling point of the benzene the ether complex is added. 9.13 pounds of $BF_3(C_2H_5)_2O$ dissolved in an equal weight of benzene is added slowly to 1920 pounds of the rubber cement. About 15 minutes should be consumed in adding the ether complex. The reaction vessel is equipped with a reflux condenser. The reaction mixture is stirred during the addition of the reagent and the stirring is continued with sufficient heat to cause the reaction to progress until the desired reaction has taken place. A cement with a viscosity of about .28 to .30 minute (Gardner mobilometer) will give a product suitable for coating compositions, etc. When the desired reaction has been completed, five pounds of water is added to the reacted cement to stop the reaction of the boron fluoride. The reacted cement is then passed through a filter into the precipitation vessel.

The precipitation vessel contains about 4000 pounds of water warmed to 80° F. 14.3 pounds of soda ash and 2.4 pounds of stearic acid are dissolved in about 10 gallons of water. This is brought to a boil and the heating continued until the acid is completely converted to soap. The soap solution is then added to the water in the precipitation vessel. When the soap solution is well dispersed, the reacted cement is then turned into it with stirring and agitation. About 1.21 pounds of zinc sulfate ($ZnSO_4.7H_2O$) dissolved in one gallon of water is then added to the emulsion in the precipitating vessel. After the stearate has been converted to the zinc salt the emulsion is subjected to steam distillation to volatilize the benzene. As the benzene evaporates the end product is precipitated in finely divided form. This is filtered and dried, preferably in a vacuum.

Sodium sulfite may be added to the water of the precipitating bath and ordinarily this will be desirable.

It may be desirable to treat the rubber cement with hydrochloric acid before adding the boron fluoride. The hydrogen chloride may advantageously be introduced in aqueous form. However, when used in aqueous form it is important that the water be eliminated before adding the boron fluoride complex. This may be done by boiling the cement under a reflux condenser with a trap in the reflux line to separate the water.

I claim:

1. The method of producing a condensation derivative of rubber by reacting rubber with boron fluoride which comprises adding to rubber in solution a boron fluoride complex of the class consisting of the low molecular weight ether complexes and the ester complexes formed from the low molecular weight fatty acids.

2. The method of producing a condensation derivative of rubber by reacting rubber with boron fluoride which comprises adding to rubber in solution a boron fluoride complex of a low molecular weight ether.

3. The method of producing a condensation derivative of rubber by reacting rubber with boron fluoride which comprises adding to rubber in solution a boron fluoride complex of the class consisting of the low molecular weight ether complexes and the ester complexes formed from the low molecular weight fatty acids, emulsifying the reacted cement thus obtained in water with an emulsifying agent and then removing the solvent of the cement by volatilization.

4. The method of producing a condensation derivative of rubber by reacting rubber with boron fluoride which comprises adding to rubber in solution a boron fluoride complex of the class consisting of the low molecular weight ether complexes and the ether complexes formed from the low molecular weight fatty acids, emulsifying the reacted cement in an alkaline aqueous solution containing an emulsifying agent and then removing the solvent of the cement by volatilization.

THOMAS C. MORRIS.